United States Patent [19]

Brewster et al.

[11] 3,943,489
[45] Mar. 9, 1976

[54] ELECTRICAL CONTROL SYSTEMS

[75] Inventors: Arthur Edward Brewster, Thaxted; Donald Adams Weir, Goff's Oak, near Cheshunt; Christopher Alan Watson, Takeley; Roger Geoffrey George, Arkley; Michael James Phillips, Stansted, all of England

[73] Assignee: Standard Telephone and Cables Limited, New York, N.Y.

[22] Filed: Sept. 5, 1974

[21] Appl. No.: 503,265

[30] Foreign Application Priority Data

Sept. 21, 1973 United Kingdom............... 48378/73

[52] U.S. Cl............................. 340/147 SY; 340/163
[51] Int. Cl.²........................................ H04Q 11/00
[58] Field of Search......... 340/151, 168 R, 168 CC, 340/163, 409, 147 SY, 147 CN

[56] References Cited
UNITED STATES PATENTS

| | | |
|---|---|---|
| 3,683,197 | 8/1972 | Ives................................ 340/163 X |
| 3,794,977 | 2/1974 | Thorne-Booth............... 340/147 SY |
| 3,828,313 | 8/1974 | Schull........................... 340/147 SY |

*Primary Examiner*—Harold I. Pitts
*Attorney, Agent, or Firm*—James B. Raden; William J. Michals

[57] ABSTRACT

A time-division multiplex (TDM) control system for controlling a plurality of devices from a central point includes a transmitter whose output is coupled over a common path to a plurality of receivers respectively located adjacent to the devices. The transmitter provides a repetitive cycle of a predetermined number of time slots during which a control signal is provided at any one or all of the time slots. Each receiver is assigned a given time slot corresponding to one of the time slots in the repetitive cycle of the transmitter, and each receiver is responsive to the control signal during its given time slot. Each receiver is operative to control one of the devices in response to the control signal.

5 Claims, 2 Drawing Figures

ELECTRICAL CONTROL SYSTEMS

BACKGROUND OF THE INVENTION

The present invention relates to electrical control systems for use where a number of devices have to be controlled from a central point. Such systems are particularly suited for use in mobiles such as cars and ships, but are also applicable to buildings or other fixed complexes.

SUMMARY OF THE INVENTION

According to the invention there is provided an electrical control system for controlling a number of devices from a central point, which includes transmitting means at the central point connected over a single signal path to a number of controlled points, wherein each one of the devices is allocated a time position in a repetitive cycle of time positions at which a control signal, which may be a logical 1 or 0 signal, may be sent in respect of that device, wherein at each of said controlled points there is a receiver responsive only to signals at its time position in the repetitive cycle, wherein when a said receiver detects control signals at its time position those signals are used to control one of the devices, and wherein to maintain a controlled device in a given one of two states or to alter its condition in one of two senses a continuous stream of 1 or 0 signals is sent from the central point at that device's time position.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
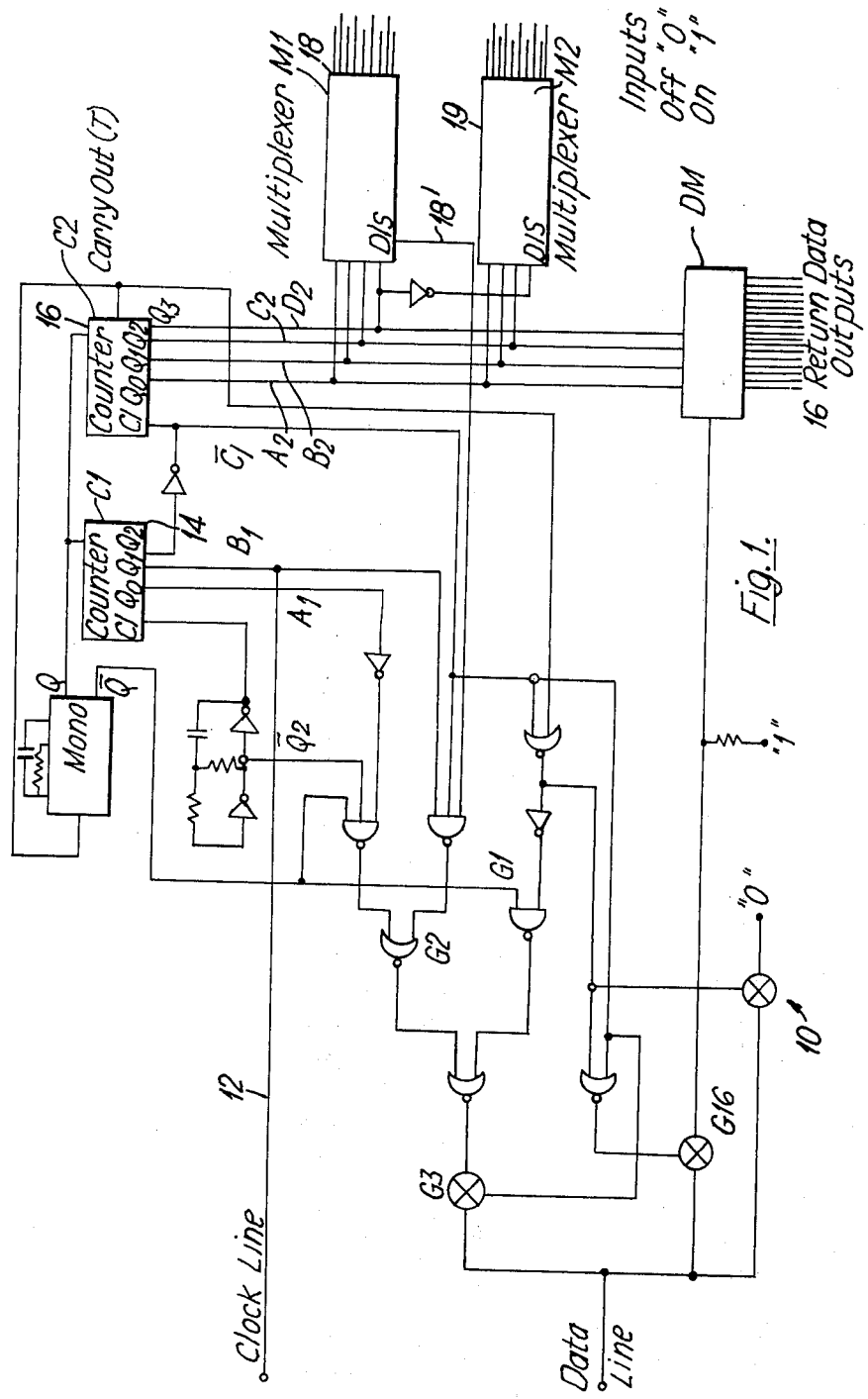
FIG. 1 is a schematic diagram of a preferred embodiment of a transmitter in accordance with the present invention; and, FIG. 2 is also a schematic diagram of a receiver suitable for use with the transmitter of FIG. 1 in accordance with the teachings of the present invention.

The circuits shown are described specifically for use in a road vehicle, where the controlled devices include headlamps, rear lamps, or radio, heaters, etc. However, it will be understood that the system is not limited to the specific application disclosed herein. The signal wiring, which can be combined with a main power supply conductor, can be on adhesive-backed ribbon which is pressed against any convenient surface, e.g., a wall. In the case of a building the ribbon can then be painted, papered over, or otherwise suitably finished. Accordingly, when an additional controlled unit is to be added, this can easily be done at any convenient point without disturbing the rest of the installation.

In the arrangement to be described, the controlled devices are each allocated a time slot in a time-division multiplex (TDM) control system. The control transmitter, which is an automobile may be located at the dashboard, constantly cycles the time slots at a rate, in one example, of 20 cycles per second, and can generate a single pulse in any time slot under the control of the dashboard switches. The receiver for a particular device is preset to respond only to pulses at its allocated time slot. Thus putting the headlamp switch to its "on" state causes a pulse to appear in the "headlamp" time slot in each successive TDM cycle. The headlamp control receiver keeps the headlamp "on" as long as it continues to detect pulses in its own time slot. Cessation of the pulse sequence, due to setting the switch to its "off" position, allows the receiver to switch the headlamp off. It should be appreciated that this control function occurs independently of the presence or absence of pulses in other time slots.

Basically, such a system needs but one control wire to which all receivers are connected "in parallel," but separate wires for clock pulse signals and possibly a main power supply conductor may be utilized. Normally the system is installed with several spare time slots provided to allow for extra devices to be controlled, particularly since the extra cost is minimal. All receivers are essentially functionally identical, and each one is preferably identified with its controlled device by a simple method of coding such as a predetermined pattern identification or a coding plate fitted with the connecting means by which it is connected to the control wire. The control wire can also be used to carry return signals from monitoring functions such as fuel level, oil pressure, etc., though here also a separate wire can be used if desired.

Where the system is used other than in vehicle control, it need not be confined to "on-off" operation, but could be adapted for continuously controlling apparatus which usually needs a multiple cable. One example is a remote-controlled television camera with requirements for movement in aximuth and elevation, and focus, zoon and iris control. Two time slots are needed for each "function," one for each of its directions. This would enable control to be via a simple shielded pair, and not (as is usual) an expensive multiple cable which may be as much as one inch in diameter or even greater. In this case, it is possible to dispense with the control cable by locking the multiplexer clock rate to the video sync. pulses, and inserting the control pulses into the video transmission line during video retrace periods.

Figure 2:
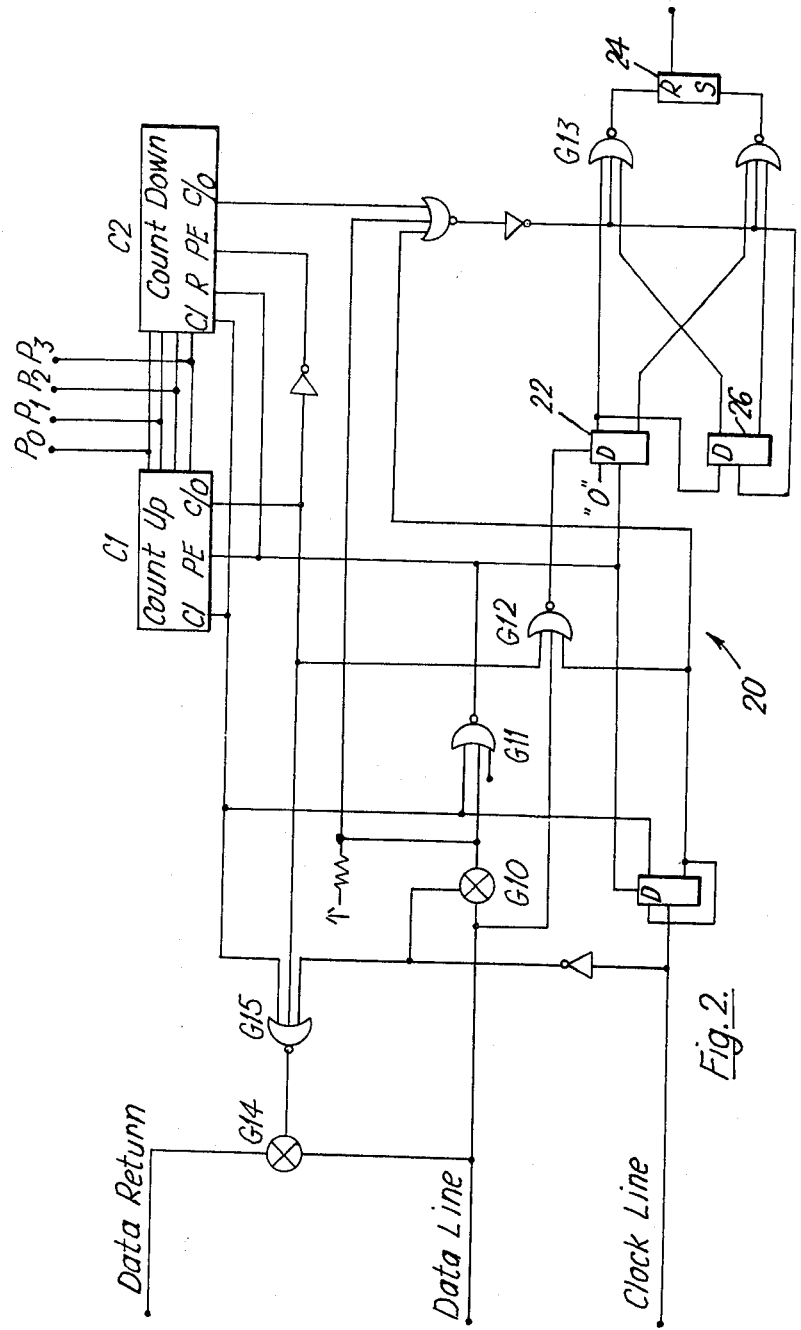

Referring generally to FIGS. 1 and 2 most of the elements shown are standard integrated circuit units, although there are a few discrete components. The controlling switches on the dashboard are connected to inputs to two multiplexers M1 and M2, FIG. 1, which are controlled from the second of two counters C1 and C2, which latter are driven by the clock pulses which reach the transmitter on a clock line. The result is that the multiplexers' output lead has a logical 1 in each time slot for a switch which is "on" and a logical 0 for each switch which is "off". These "pulse" or "no-pulse" conditions reach the data line via the various NAND gates (e.g., G1) NOR gates (e.g., G2) and Transmission gates (e.g., G3).

Any returned signals from the controlled devices enter the transmitter over the data line, and are "demultiplexed" by the demultiplexer DM, which has 16 return data outputs. The "carry out" lead from the counter C2 is used to reset the apparatus at the transmitter to its state appropriate to the next TDM cycle. It also switches the Monostable circuit Mono to its 1 state in which it remains for its defined time. While in this state it disables the various gates to introduce an intercycle "dead" period.

Referring more specifically to FIG. 1, a clock pulse generator (not shown) supplies clock-pulses to transmitter 10 along clock line 12. The pulses drive a counter 14 (C1) which in effect acts as a pulse divider for a second counter 16 (C2), the latter controlling a multiplexer 18 (M1). Thus M1 steps through its cycle in which it successively connects its inputs to common output 18', whereafter it reverts to a "zero" state, and a second multiplexer 19 (M2) then steps through its cycle.

In the companion receiver 20 of FIG. 2, which is associated with one of the controlled devices, there are two counters whose outputs are so connected to the data line that receiver 20 only responds to pulses in its own time slot.

The counters of the receivers are of the so-called programmable type, so that each receiver's counters can be appropriately set for its time slot (or time slots). The counters of each receiver are arranged as "up-down" counters, that is one counts up to "all ones" from its setting, while the other counts down to "all zeroes," both being programmed by the same binary input.

In most of the applications of the system described herein it is important that the system should operate reliably and with integrity in an environment of high electrical noise as described below. Accordingly, a number of features are embodied in the system. For example, the ribbon conductors referred to above can be provided with grounded tracks between the signal lines thus reducing induced interference. A choice of quiescent voltage on the data and signal lines is made which not only identifies the data period, but which also allows a reset condition to arise in the presence of noise spikes of both positive and negative going polarities. The system allows a clock cycle to be identified as valid only if the exact number of required clock pulses are received. A persistence of change in control instruction is required before a response occurs, that is at least two validated commands must be received to initiate a change in state; and invalid data bursts are disregarded. A pause between data periods is provided which allows transients due to load switching to occur during the pause, i.e., not during the data periods, thus minimizing the effects of self generated switching transients.

Opposing polarities are used on the data and clock lines, i.e., a time slot is defined when the clock is high and a command signal is defined on the data line by a low signal. Thus positive-going noise during a high clock period negates the command "on" signal, but on its next repeat it is normally effective. If positive going noise occurs in a low clock period, it produces a false count, and thus no strobe pulse appears. This function follows from the configuration of the logical gates used. Negative-going noise in a high clock period produces low clock and data lines, which is the reset condition. In a similar manner, negative-going noise in a low clock period is a reset condition.

As previously alluded to, a pause can be introduced at the end of each multiplex cycle, in which power switching can occur, so that switching transients do not interfere with the active signalling cycle. It should be noted that such a pause also provides synchronization. It can be done by making the multiplex cycle part of a longer cycle, or by running the clock on a stop-start basis, with a fixed delay between successive starts.

In accordance with a feature of the present invention, each receiver is able to transmit on the same data line over which it receives signals from the control unit, either digital or analog signals. In the preferred embodiment described herein, this is effected by transmitting two clock pulses per time slot, one defining the period for a command signal from control station to receiver, and the other the period for sending the other way.

It should be noted that in a given embodiment of the system in accordance with the present invention in which the control path is limited to the use of but one wire, a self-clocking system could be used. Such techniques are generally well known in the art. For example, where the time slot embraces two clock pulses, one for a command signal and one for a return signal, a pulse generator in the receiver may be used, which would emit a pulse one clock interval later than the count at which the receiver examines the line for its control signal. This places the return signal correctly in the second half of the time slot, the main timing being effected by the counters of the receiver. The return pulses are detected by a demultiplexing receiver at the transmitter of the control point, and routed to lamps or other suitable indicators of what is being monitored. As for command signals, a permanent "on" state is signalled by repeating the pulse in each successive cycle. Cessation of the pulse allows the indicator to revert to its off state.

Although the "control" and "answer back" or return pulses are closely spaced, that is typically 100 microsecs apart, the controlled function need not be completed within this time for a correct reply. Thus if a function takes place in one second, the return pulses would not commence until one second after the control pulse train was detected. However, this is not a disadvantage as the control and answer channels are in effect independent.

Since the signal repetition rate of the system in accordance with the present invention is relatively high, and since analog switches can be used in the return signal path, it is possible to extend the basic concept of the present invention wherein the return signal consists of a continuous pulse stream for device "on" and no pulses for "off," and each pulse occupies the whole of a return signal period. Thus signal variables such as fuel level, oil temperature, or road speed, can be signalled by inserting in the appropriate return signal period either an analog signal subject to the limitation that such a waveform should not have frequency components higher than can be handled by the sampling rate, or, alternatively a digital data stream can be inserted in the appropriate return signal period.

Referring now more specifically to receiver 20 of FIG. 2, the counters C1, C2 are driven by the inputs P0, P1, P2, P3 derived by means (not shown) from the clock pulse input. In certain cases these counters could be driven by a single pulse input. As previously indicated, C1 counts upwards and C2 counts downwards. Their outputs to the controlling gates are chosen so that the gates only open at the receiver's assigned time slot in the cycle. Thus at this slot the Data Line is connected by way of a clocked gate G10 and a NOR gate G11 to a D-type flip-flop 22 which is also controlled by way of another NOR gate G12 which is only enabled at the receiver's slot by the counter C1. Hence if a logical 1 is received at this time, flip-flop 22 is set, and it controls the output of an RS flip-flop 24 by way of a further NOR gate G13. In the absence of a logical 1 signal at the receiver's time slot the logic configuration shown, a second D-type flip-flop 26 resets the output RS flip-flop 24. It should be noted that the connections to RS flip-flop 24 by way of the two D-type flip-flops and the associated gates are such that a control signal must occur in at least two successive cycles to influence RS flip-flop 24.

When a signal, either a logical 1 or 0 input, or an amplitude-modulated pulse, has to be sent from a controlled point to the central station a pulse is received on the Data Return lead and is applied to the data line by way of another gate G14 which is opened at the receiver's time slot by way of gate G15. Accordingly, this configuration is clock- and counter- controlled so as to enable the return path thus provided in the second half of the multiplex slot.

At transmitter 10 of the central station of FIG. 1, the gate G16 is opened under counter and clock control to pass the return data pulse which goes to the demultiplexer DM, which routes it to the appropriate one of its sixteen outputs.

It is to be understood that the foregoing description of specific embodiments of this invention is made by way of example only and is not to be considered as limiting its scope.

What is claimed is:

1. An electrical control system for controlling a number of devices from a central point, including:

transmitting means at said central point coupled over a single signal line to a plurality of controlled points, wherein each of said devices is allocated a time position in a repetitive predetermined cycle of time positions at which a control signal provided by said transmitting means respectively controls each device;

a plurality of receivers respectively disposed at said devices wherein each receiver is responsive only to signals at its time position in the repetitive cycle so that when one of said receivers detects control signals at its time position those signals are coupled to the device to be controlled, and wherein a continuous stream of control signals is provided by said transmitting means during the corresponding time position of the device to maintain a controlled device in a given one of two states;

wherein return data signals from the controlled devices are coupled to said central point over said single signal line and wherein each time position includes first and second portions, said first portion manifesting said control signals and said second portion manifesting said return data signals; and, including a common clock pulse generator the output of which controls said transmitting means and all of said receivers, the output thereof being distributed by way of a common clock line extending to said transmitting means and to all of said receivers.

2. A system according to claim 1, in which said receivers are essentially identical and control signals are detected at each receiver by logic gates controlled by programmable up-down counters which are programmed to provide output pulses to control said gates at the time position respectively allocated to device corresponding to each receiver.

3. The system according to claim 1, wherein the connections from each said receiver to its controlled device include coding means to identify each receiver with its corresponding device.

4. The system as claimed in claim 1 in which pulses of opposite polarities are used for said signal line and for said clock line.

5. The system according to claim 1, in which a control signal is detected as valid only if it occurs at the same time position in at least two successive cycles.

* * * * *

PO-1050
(5/69)

UNITED STATES PATENT OFFICE
CERTIFICATE OF CORRECTION

Patent No. 3,943,489      Dated March 9, 1976

Inventor(s) A.E. Brewster-D.A. Weir-C.A. Watson-R.G. George-M.J. Phillips

It is certified that error appears in the above-identified patent and that said Letters Patent are hereby corrected as shown below:

After item "[73]" of the cover page, change "Standard Telephone and Cables Limited" to --ITT Industries, Inc.--.

Signed and Sealed this fifteenth Day of June 1976

[SEAL]

Attest:

RUTH C. MASON
Attesting Officer

C. MARSHALL DANN
Commissioner of Patents and Trademarks